United States Patent
Wigell et al.

(10) Patent No.: US 6,928,304 B2
(45) Date of Patent: Aug. 9, 2005

(54) AUTOMATIC REPETITION REQUEST MECHANISM IN A RADIO ACCESS NETWORK

(75) Inventors: Toomas Wigell, Espoo (FI); Janne Peisa, Helsinki (FI); Raul Soderstrom, Kyrkslatt (FI); Johan Torsner, Esbo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 542 days.

(21) Appl. No.: 10/050,313

(22) Filed: Jan. 16, 2002

(65) Prior Publication Data

US 2002/0094814 A1 Jul. 18, 2002

(30) Foreign Application Priority Data

Jan. 16, 2001 (GB) ............................................. 0101103

(51) Int. Cl.[7] ............................. H04M 1/00; H04Q 7/24
(52) U.S. Cl. ..................... 455/561; 455/436; 455/450; 455/451; 455/442; 455/428; 455/445; 370/338; 370/401; 370/474; 370/428; 370/429
(58) Field of Search ............................... 455/561, 436, 455/450; 370/338, 401, 474, 468, 229, 428, 429, 442, 445

(56) References Cited

U.S. PATENT DOCUMENTS

| | | | | |
|---|---|---|---|---|
| 5,752,193 A | * | 5/1998 | Scholefield et al. ...... | 455/452.2 |
| 6,167,040 A | * | 12/2000 | Haeggstrom ................ | 370/352 |
| 6,603,739 B1 | * | 8/2003 | Dubuc ......................... | 370/232 |
| 6,661,782 B1 | * | 12/2003 | Mustajarvi et al. ......... | 370/331 |
| 6,697,331 B1 | * | 2/2004 | Riihinen et al. ............. | 370/236 |
| 6,711,126 B1 | * | 3/2004 | Besset-Bathias ............ | 370/229 |
| 6,718,179 B1 | * | 4/2004 | Forssell et al. ............. | 455/509 |
| 2002/0080719 A1 | * | 6/2002 | Parkvail et al. ............. | 370/235 |
| 2002/0091860 A1 | * | 7/2002 | Kalliokulju et al. ........ | 709/247 |
| 2002/0099854 A1 | * | 7/2002 | Jorgensen ................... | 709/249 |
| 2003/0165161 A1 | * | 9/2003 | Kalliokulju et al. ........ | 370/466 |

FOREIGN PATENT DOCUMENTS

| | | |
|---|---|---|
| EP | 1 056 258 A1 | 11/2000 |
| WO | 00/60799 A1 | 10/2000 |

OTHER PUBLICATIONS

Kevin Houzhi Xu, "Reliable Stream Transmission Protocols in Mobile Computing Environments", XP-000703746, Bell South Labs Technical Journal, pp. 157–162, Summer 1997.
3GPP TS 125 401 v3.3.0 (Jun. 2000) Technical Specification: Universal Mobile Telecommunications System (UMTS): UTRAN Overall Description (3G TS 25.401 version 3.3.0 Release 1999), Jun., 2000.

* cited by examiner

*Primary Examiner*—Sonny Trinh
*Assistant Examiner*—Huy Phan (57) ABSTRACT

A method of handling the transmission of Radio Link Control (RLC) Protocol Data Units (PDUs) from a Radio Access Network (RAN) of a mobile telecommunications system to User Equipment (UE). At a Gateway of the RAN, RLC Service Data Units (SDUs) are segmented into RLC PDUs for transmission to one or more Base Stations (BSs) of a set of BSs belonging to a handover link set. RLC PDUs received from one or more of those BSs are combined into RLC SDUs for transmission to a core network of the system. Each of the BSs buffers the RLC PDUs received from the Gateway and/or the UE. An Automatic Repetition Request (ARQ) mechanism is implemented at each of the BSs to facilitate reliable transmission of RLC PDUs between the UE and the Gateway.

12 Claims, 7 Drawing Sheets

AUTOMATIC REPETITION REQUEST MECHANISM IN A RADIO ACCESS NETWORK

BACKGROUND

The present invention relates to an automatic repetition request (ARQ) mechanism in a radio access network handling the transmission of data to and from User Equipment (UE). More particularly, the invention is concerned with the handling of Automatic Repetition Request (ARQ) messages at mobile terminals and in the radio access network of a mobile telecommunications network.

Figure 1:
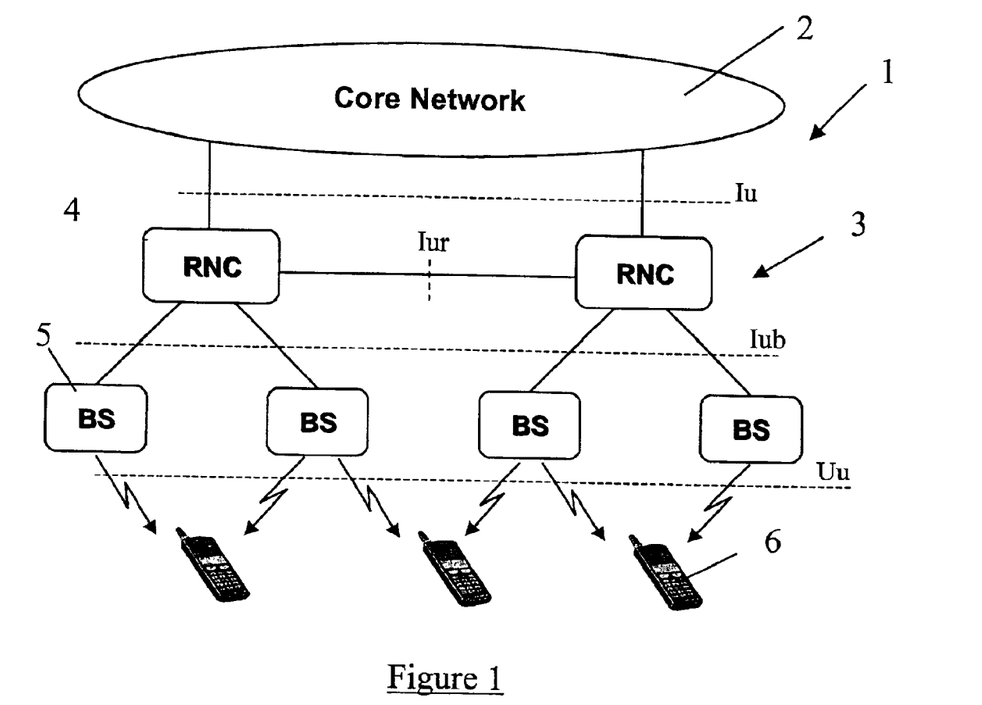
FIG. 1 illustrates the interfaces present in a conventional RAN architecture of a mobile telecommunications network.

The European Telecommunications Standardisation Institute (ETSI) is currently in the process of standardising a new set of protocols for mobile telecommunications systems. The set of protocols is known collectively as the Universal Mobile Telecommunications System (UMTS). FIG. 1 illustrates schematically a UMTS network 1 which comprises a core network 2 and a UMTS Terrestrial Radio Access Network (UTRAN) 3. The UTRAN 3 comprises a number of Radio Network Controllers (RNCs) 4, each of which is coupled to a set of neighbouring Base Stations (BSs) 5—BSs are often referred to as Node Bs. Each BSs 5 is responsible for communicating with mobile terminals (or User Equipment (UE)) 6 within a given geographical cell, and the controlling RNC 4 is responsible for routing user and signalling data between a BS 5 and the core network 2. The interface between the RNCs is referred to as the Iur interface, whilst that between the BSs and the RNCs is referred to as the Iub interface. The air interface between the UE and the BSs is referred to as the Uu interface. A general outline of the UTRAN 3 is given in Technical Specification TS 25.401 V3.3.0 (1999–09) of the 3rd Generation Partnership Project, 3GPP.

A layer 2 functionality is implemented at the RNCs. This is referred to as the Radio Link Control (RLC) layer or entity. An RLC entity receives RLC SDUs from a PDCP entity (which in turn receives PDCP SDUs from the core network), and is responsible for segmenting the RLC SDUs into RLC PDUs and for RLC PDU sequence numbering. RLC PDUs are buffered by the RLC entity whilst being passed to the appropriate BS(s) for transmission over the air (Uu) interface. Under the UTRAN proposals, certain transmission channels (e.g. DCHs and DSCHs) make use of a mechanism known as Automatic Repetition reQuest (ARQ) to facilitate the retransmission of data packets (i.e. RLC PDUs) which are either not received, or are received erroneously by a receiving entity, i.e. a UE or a RNC. The sending of an ARQ status message from a receiver may be ordered under this mechanism, the ARQ status message containing one or more acknowledgements (ACKs), indicating the successful receipt of a packet or packets, and/or one or more NACKs, indicating that a packet (or packets) has not been received or has been received incorrectly. It will be appreciated that the retransmission path, involving as it does passage through a BS, can introduce a considerable delay into the retransmission time and can impact significantly on the performance of higher layer protocols (e.g. TCP).

Figure 2:
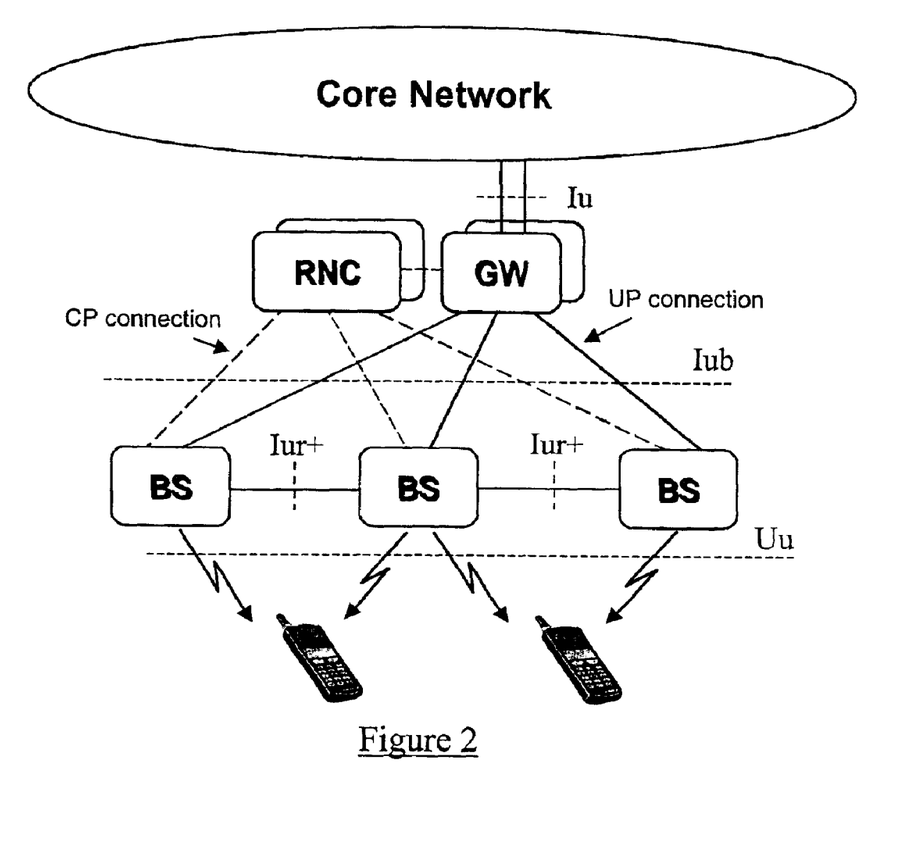
FIG. 2 illustrates the interfaces present in a modified RAN architecture network.

One way to reduce the length of the retransmission path is to implement a new RAN architecture in which the ARQ mechanism is implemented in the BSs and not in the RNCs. FIG. 2 illustrates an architecture in which user plane and the time critical part of control plane handling is carried out in the BSs and the Gateway (GW) to the core network, whilst non-time critical control plane handling is carried out in the RNC (in the architecture of FIG. 1, the GW is integrated into an RNC). A new interface between the BSs is created, this being referred to hereinafter as the Iur+ interface. The interfaces of the new network are also illustrated in FIG. 2.

The conventional RAN architecture of FIG. 1 employs a mechanism known as soft handover to enhance system performance at cell borders and to facilitate the smooth transfer of UEs between BSs. During a soft handover, data may be sent and received in parallel between two or more BSs and a UE. At the receiver, information is combined at the physical layer before it is passed to the ARQ protocol (at layer 2). As ARQ is handled at the RNC, the retransmission of data causes no problems (other than the problem of retransmission delay already noted). For data transmission in the downlink direction, the RNC collects ARQ status messages returned from a UE (and forwarded by the various BSs involved in the soft handover) and sorts these to determine which data has been correctly received by the UE and which, if any, must be retransmitted. For data transmission in the uplink direction, the RNC is again able to co-ordinate the receipt of data packets sent from the UE and to transmit appropriate ARQ status messages to the UE.

For certain types of downlink channel it is not desirable to transmit data in parallel to a UE from several BSs. However, the soft handover process described may occur for uplink channels, with the (downlink) sending buffers of the soft handover BS set being synchronised in readiness for a hard handover. This situation is also considered here to be a semi-soft handover situation for the downlink channel.

SUMMARY

The inventors of the present invention have recognised that if the RAN architecture of FIG. 2 is introduced, even though the retransmission time for data is reduced, the processing of ARQ status messages transmitted by a UE, and the sending of ARQ status messages to a UE, is no longer co-ordinated by the RNC. Unless the Base Stations of a soft handover set are located at the same sites (sharing a common RLC entity), the lack of co-ordination may result in a significant deterioration in network performance.

Considering first the downlink direction, where a soft handover is occurring and several BSs are transmitting in the downlink direction in parallel, it is possible that the different streams received by the UE will be time shifted from one another. The UE will check the data packets received from all BSs in the soft handover link set, and will issue an ARQ status message (containing ACKs and NACKs) based on correctly and incorrectly received packets. A BS may therefore receive an ARQ status message containing an ACK for a data packet which it has not yet sent. The ACK will be treated by the BS as an error and may cause the BS to enter a protocol deadlock state.

It is an object of the present invention to overcome or at least mitigate the above noted disadvantages. This and other objects are achieved by splitting the RLC layer between a Gateway and the BSs, so that RLC SDU splitting/concatenation and RLC PDU sequence numbering is handled by an upper RLC layer at the GW, whilst the ARQ mechanisms are located at the BSs.

According to a first aspect of the present invention there is provided a method of handling the transmission of RLC PDUs from a Radio Access Network (RAN) of a mobile telecommunications system to User Equipment (UE), the method comprising:

at a Gateway (GW) of the UTRAN, segmenting RLC SDUs into RLC PDUs for transmission to one or more Base Stations (BSs) of a set of BSs belonging to a handover link set, and combining RLC PDUs received from one or more of those BSs into RLC SDUs for transmission to a core network of the system; and at the or each said BS, buffering RLC PDUs received from the GW and or the UE, and implementing an ARQ mechanism at the or each BS to facilitate reliable transmission of RLC PDUs between the UE and the GW, the ARQ mechanism utilising ARQ status messages sent over the air interface, between the UE and the BS(s), in order to acknowledge successfully transmitted data packets and request retransmission of unsuccessfully transmitted data packets.

The ARQ mechanism utilises ARQ status messages sent over the air interface, between the UE and the BS(s), in order to acknowledge successfully transmitted data packets and request retransmission of unsuccessfully transmitted data packets.

Preferably, a Packet Data Convergence Protocol (PDCP) sub-layer is located in the GW, and the RLC entity exchanges RLC SDUs (PDCP PDUs) with the PDCP sub-layer. The PDCP sub-layer exchanges PDCP SDUs with the core network of the mobile telecommunications system.

Preferably, a flow control mechanism is implemented between the BSs and the GW in order to minimise the buffer sizes at the BSs and to reduce the need for retransmission of data between the GW and a new BS when that new BS is added to the link set. More preferably, for data transfer in the downlink direction, the BSs notify the GW of successfully sent PDUs and in response the GW issues Status_Update messages to the BSs to cause the BSs to discard all PDUs belonging to this SDU. For data transfer in the uplink direction, RLC PDUs successfully received by a BS are passed to the GW. When the GW has successfully constructed an SDU, an appropriate Status_Update message is sent from the GW to the BSs of the soft handover link set to cause the BSs to discard all PDUs belonging to this SDU.

In the downlink direction, RLC PDUs are sent from a Base Station (BS) of the Radio Access Network (RAN) to a UE, with each said data packet having a sequence number. The method comprises implementing at the BS the ARQ mechanism for resending data packets erroneously received by the UE and, upon receipt of an ARQ status message from the UE, advancing a transmission window of the BS so that its lower region covers the packet having the lowest sequence number for which an ARQ acknowledgement has not yet been received. The transmission window is also advanced following receipt of appropriate flow control messages from the GW. In addition, ARQ messages received by a given BS may be sent (over the Iur+) to other BSs.

Typically, the GW communicates with a plurality of BSs of a soft handover (SHO) link set. In some cases, all of the BSs of the SHO link set may be sending and/or receiving user data packets. This may be the case for example where the UE has been allocated a Dedicated Channel (DCH). However, for example where the UE has been allocated a Downlink Shared Channel (DSCH), only one of the BSs of the SHO link set may be transmitting to the UE. In this case, all other BSs of the SHO link set seek to synchronise their buffers with the transmission buffer of the transmitting BS.

According to a second aspect of the present invention there is provided a mobile telecommunications system comprising a UMTS Terrestrial Radio Access Network (UTRAN) and, located in the UTRAN:

a Gateway (GW) arranged to segment RLC SDUs into RLC PDUs for transmission to one or more Base Stations (BSs) of a set of BSs belonging to a handover link set, and to combine RLC PDUs received from one or more of those BSs into RLC SDUs for transmission to a core network of the system; and a plurality of Base Stations (BS) arranged to form a soft handover link set for a given User Equipment (UE), each said BS being arranged to buffer RLC PDUs received from the GW and or the UE and to implement an ARQ mechanism at the or each BS to facilitate reliable transmission of RLC PDUs between the UE and the GW, the ARQ mechanism utilising ARQ status messages sent over the air interface, between the UE and the BS(s), in order to acknowledge successfully transmitted data packets and request retransmission of unsuccessfully transmitted data packets.

According to a third aspect of the present invention there is provided a Gateway for use in the system of the above second aspect of the invention.

According to a fourth aspect of the present invention there is provided a Base Station for use in the system of the above second aspect of the invention.

DETAILED DESCRIPTION

A conventional RAN architecture has already been described with reference to FIG. 1. A modified architecture has been described with reference to FIG. 2 and in which Base Stations (BSs) are connected together over an Iur+ interface. Considering now the modified RAN architecture in which the ARQ mechanism is implemented in the UE and the BSs so that ARQ status messages are terminated at the BSs for downlink transmissions and are initiated at the BSs for uplink transmissions, reference is now made to FIGS. 3 to 6 which illustrate a fast ARQ mechanism with soft handover (SHO) feature.

Figure 3:
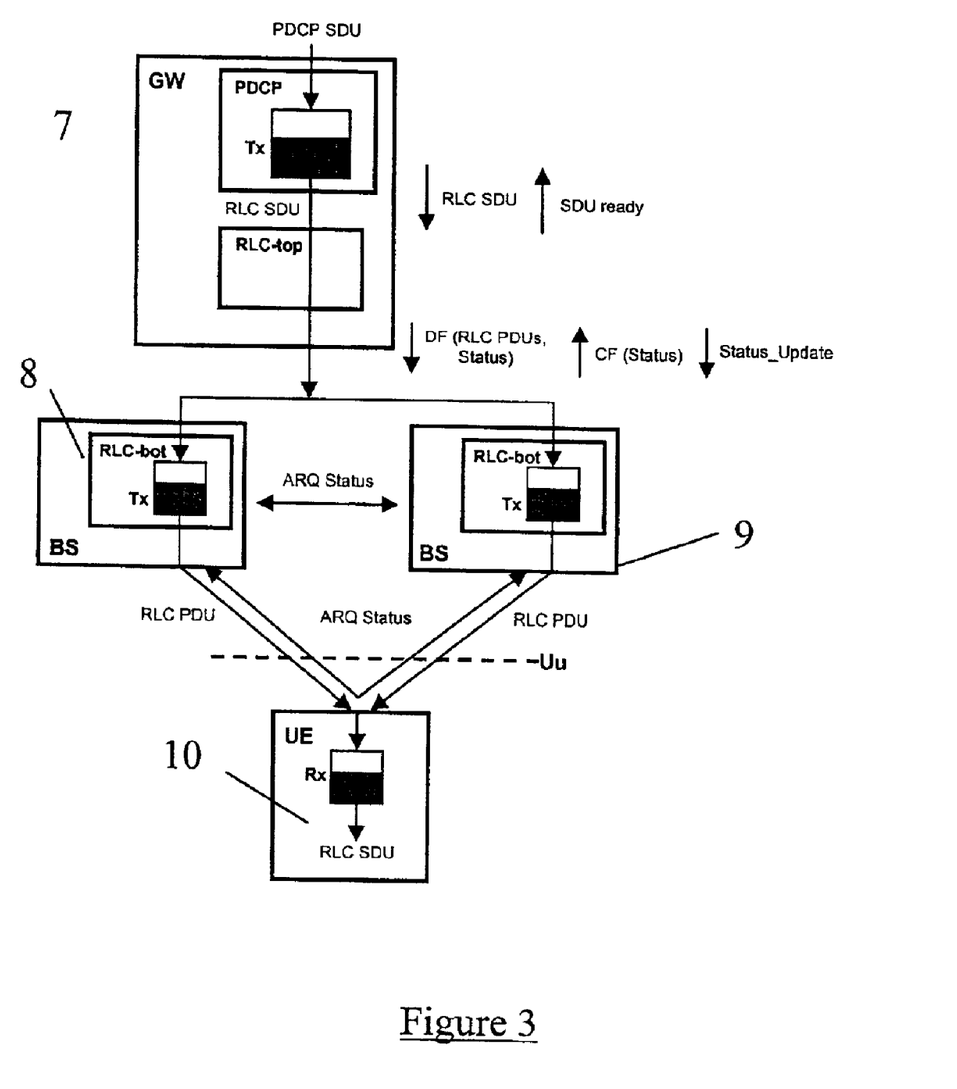
FIG. 3 illustrates schematically a part of a RAN with downlink data streams present.

The L2 functionality of the UTRAN is split between a GW 7 and BSs 8,9. The PDCP sub-layer is located in the GW 7 and has in general the same functionality as the PDCP sub-layer in the existing UTRAN. The RLC sub-layer is split into an RLC-top located in the GW 7 and multiple RLC-bots located in respective BSs 8,9.

Downlink Data Flow (BS Transmitting)

User packets destined for a given UE 10 and received from the core network are first placed into a GW buffer as PDCP SDUs. A PDCP SDU is kept in the GW buffer until the RLC informs the GW about successful transmission of the appropriate RLC SDU to the UE 10.

The RLC-top performs segmentation of RLC SDUs and RLC PDU sequence numbering and transmits RLC PDUs to all BSs (i.e. BSs 8,9) belonging to the active SHO. The RLC-bot buffers the RLC PDUs received from the RLC-top.

All BSs belonging to the SHO set send the RLC PDUs to the UE. The UE 10 has one receiver entity to receive PDUs from all BSs 8,9 that belong to the active SHO link set. The receiver entity receives PDUs from several different BSs, checks which of them have been correctly received, and sends feedback ARQ Status messages (based on the PDUs received from all BSs) on the uplink to the BSs 8,9 of the SHO link set. It is possible for the receiver entity to combine several incorrectly received packets in order to create a correctly received packet.

Upon receiving ARQ Status messages, BSs 8,9 update their receiver buffers. As the ARQ status message is based on collective information received at the UE, it may happen that some of the BSs receive acknowledgements for PDUs that they have not yet transmitted. In such a case, a BS should advance its transmitter window to the acknowledged sequence number. This avoids protocol deadlock states. All BSs that receive Negative ACKs (NACKs) for certain PDUs should retransmit requested PDUs. The BSs may exchange correctly received ARQ Status messages over the Iur+ interfaces. In this way an ARQ Status message received by one BS will be distributed to all other BSs (including those which may not yet have received this message).

Figure 4:
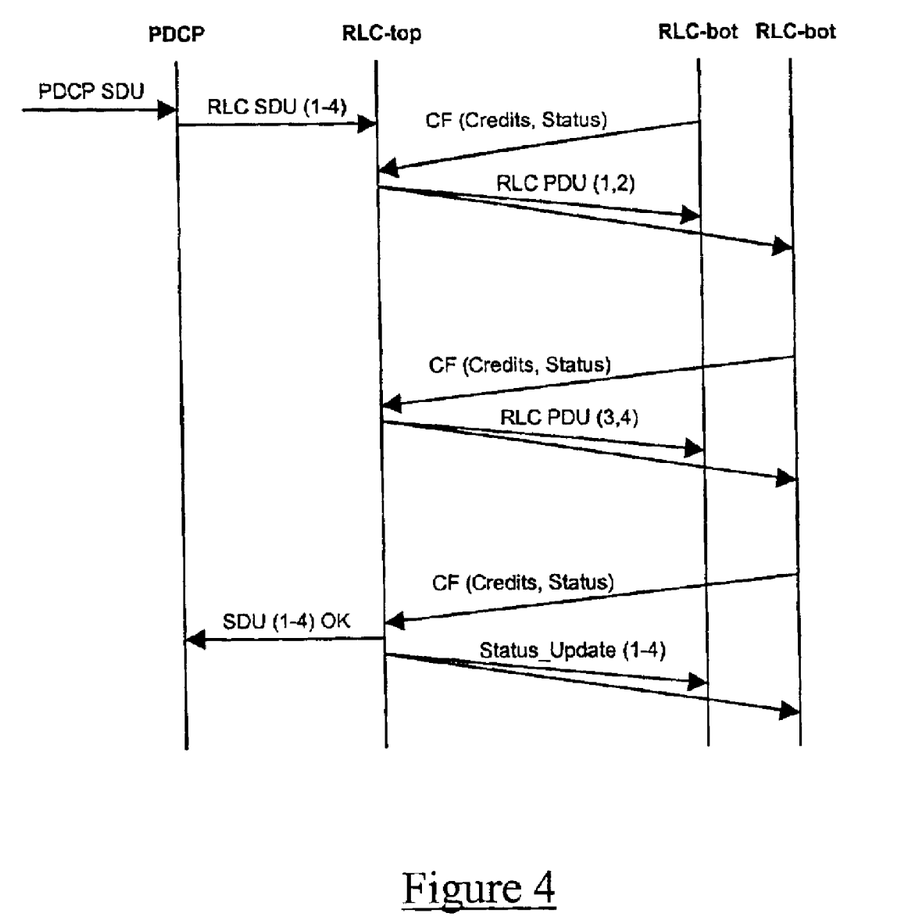
FIG. 4 illustrates signalling in the RAN network of FIG. 3.

A flow of control information is maintained between the RLC-top (in the GW) and the RLC-bot (in a BS) as illustrated in FIGS. 3 and 4. The flow control mechanism allows RLC-bot buffer sizes to be kept small and allows the amount of data which must be retransmitted to a new BS when a new SHO leg is added to be minimised. The RLC-bot informs the RLC-top of the status of its transmit buffer (e.g. lower edge of window, number of unacknowledged PDUs etc.) using a control frame (CF). The RLC-top always sends the same RLC PDUs to all involved BSs whilst, at the same time, informing all RLC-bots about lower window edge of the most successful BS, e.g. using an additional information element in a data frame (DF) with RLC PDUs as payload. The RLC-bots lagging behind the most successful RLC-Bot will move their windows according to the identified lower edge window value. This prevents the less successful BSs transmitting PDUs which have already been successfully transmitted by the most successful BS.

The RLC-top collects RLC PDU Status information received from different BSs and when a RLC SDU is completely transmitted to the UE it sends a Status_Update message to all BSs. The Status_Update message will remove all RLC PDUs from the RLC-bot buffers that belong to this RLC SDU.

When a new BS is added to the SHO link set, the RLC-top transmits to the new BS all RLC PDUs which have already been sent to the other BSs of the SHO link set but which have not yet been acknowledged.

This embodiment of the invention achieves additional synchronisation of BSs transmitter status by Status/Status_Update/control part of DF between GW and BSs for downlink.

Uplink Data Flow (UE Transmitting)

Figure 5:
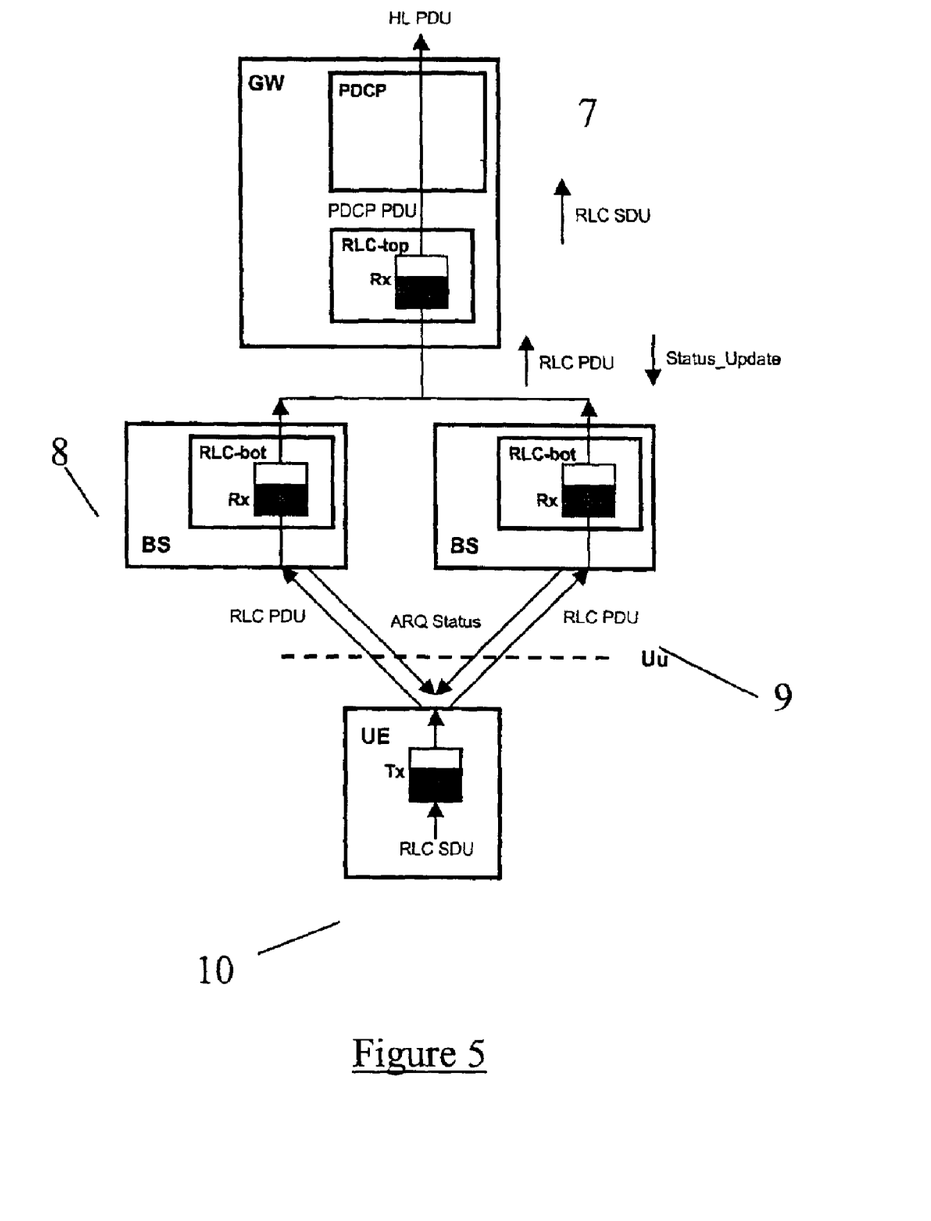
FIG. 5 illustrates schematically a part of a RAN with uplink data streams present.

The UE 10 transmits the PDUs to all BSs 8,9 belonging to the active SHO link set. The ARQ mechanism for reliable transmission of packets over air interface is located in UE and BSs as already described. BSs 8,9 belonging to the active SHO link set receive PDUs from the UE 10 and identify correctly received PDUs. They send appropriate ARQ Status messages back to the UE 10 (nb. the UE only retransmits packets which were not received by any of the BSs 8,9). Typically, the sending of ARQ Status messages by the BSs is synchronised. This may be achieved by using a polling mechanism inserted into packets sent from the UE to the BSs or, alternatively, by synchronising the BSs to one another.

Each RLC-bot passes correctly received PDUs directly to the RLC-top. Only the PDU sequence numbers of an incompletely received SDU must be stored in a BS 8,9 as they are needed for the ARQ machine. Erroneously received PDUs may be stored and soft combined in a BS 8,9.

RLC-top collects RLC PDUs received from different BSs and when a RLC SDU is constructed it will passed to the PDCP. Additionally, the RLC-top will inform RLC-bots about a successfully constructed RLC SDU by sending a Status_Update message to the RLC-bots (Status_Update messages may also be sent more frequently). The Status_Update will cause all information about RLC PDUs belong to this RLC SDU to be removed from the RLC-bot buffers.

Figure 6:
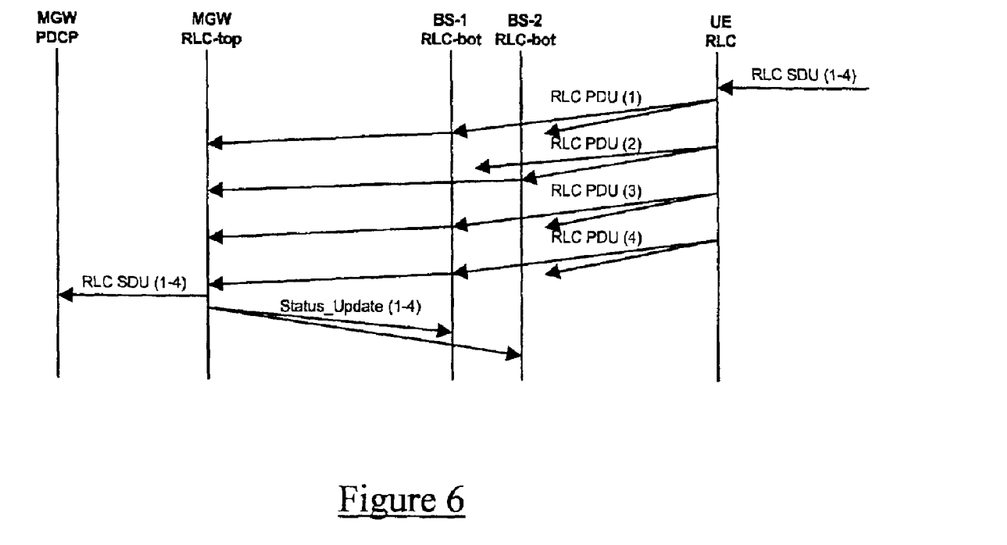
FIG. 6 illustrates signalling in the RAN network of FIG. 5.

FIG. 6 presents signalling between UE, BSs and the GW for transmission of a RLC SDU consisting of 4 RLC PDUs.

Figure 7:
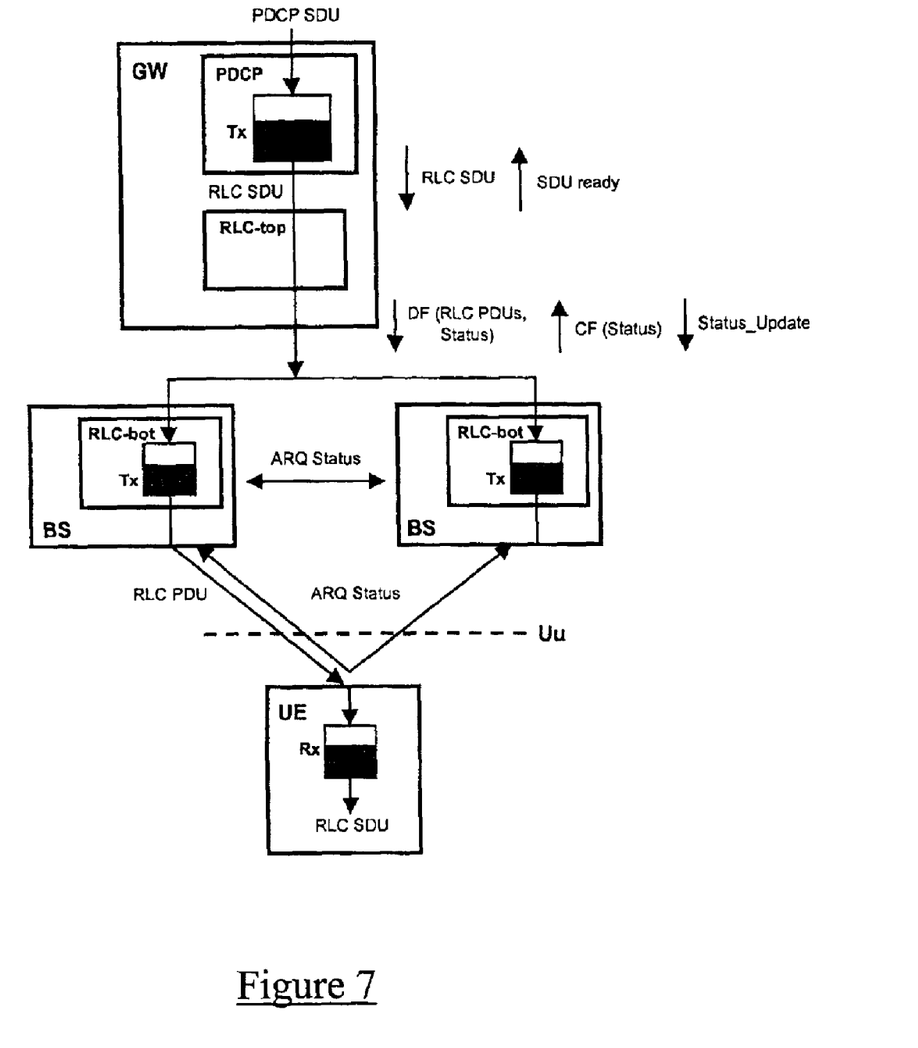
FIG. 7 illustrates a modification to the embodiment of FIG. 3.

It will be appreciated by the person of skill in the art that various modifications may be made to the above described embodiments without departing from the scope of the present invention. For example, FIG. 7 illustrates a modification to the embodiment of FIG. 3 and in which RLC ARQ messages are exchanged between BSs of the SHO link set over the Iur+ interface. Such ARQ messages are treated by BSs in the same way as ARQ messages received over the Uu interface. This mechanism is an additional aid to synchronisation of the BS transmission buffers.

What is claimed is:

1. A method of handling the transmission of Radio Link Control (RLC) Protocol Data Units (PDUs) from a Radio Access Network (RAN) of a mobile telecommunications system to User Equipment (UE), the method comprising:
   at a Gateway (GW) of the UTRAN, segmenting RLC Service Data Units (SDUs) into RLC PDUs for transmission to at least one Base Station (BS) of a set of BSs belonging to a handover link set, and combining RLC PDUs received from the at least one BSs into RLC SDUs for transmission to a core network of the system; and
   at each of the at least one BS, buffering RLC PDUs received from at least one of the GW and the UE, and implementing an Automatic Repetition Request (ARQ) mechanism at each of the at least one BS to facilitate reliable transmission of RLC PDUs between the UE and the GW, the ARQ mechanism utilizing ARQ status messages sent over the air interface, between the UE and the BS(s), in order to acknowledge successfully transmitted data packets and request retransmission of unsuccessfully transmitted data packets.

2. A method according to claim 1, wherein a Packet Data Convergence Protocol (PDCP) sub-layer is located in the GW, and the RLC entity exchanges RLC SDUs (PDCP PDUs) with the PDCP sub-layer, whilst the PDCP sub-layer exchanges PDCP SDUs with the core network of the mobile telecommunications system.

3. A method according to claim 1, wherein a flow control mechanism is implemented between the BSs and the GW in order to minimise the buffer sizes at the BSs and to reduce the need for retransmission of data between the GW and a new BS when that new BS is added to the link set.

4. A method according to claim 3, wherein, for data transfer in the downlink direction, each BS notifies the GW of PDUs which it has successfully sent and in response the GW issues Status_Update messages to the BSs to cause them to update their sending windows.

5. A method according to claim 3, wherein, for data transfer in the uplink direction, RLC PDUs successfully received by a BS are passed to the GW and, when the GW has successfully constructed an SDU, an appropriate Status_Update message is sent from the GW to the BSs of the handover link set to cause the BSs to discard all PDUs belonging to this SDU.

6. A method according to claim 1, wherein, in the downlink direction, RLC PDUs are sent from a Base Station (BS) of the Radio Access Network (RAN) to a UE, and each said data packet has a sequence number, the method comprising implementing at the BS the ARQ mechanism for resending data packets erroneously received by the UE and, upon receipt of an ARQ status message from the UE, advancing a transmission window of the BS so that its lower region covers the packet having the lowest sequence number for which an ARQ acknowledgement has not yet been received.

7. A method according to claim 1, wherein the GW communicates with a plurality of BSs of a soft handover (SHO) link set.

8. A method according to claim 7, wherein, in the downlink direction, RLC PDUs are sent from a Base Station (BS) of the Radio Access Network (RAN) to a UE, and each said data packet has a sequence number, the method comprising implementing at the BS the ARQ mechanism for resending data packets erroneously received by the UE and, upon receipt of an ARQ status message from the UE, advancing a transmission window of the BS so that its lower region covers the packet having the lowest sequence number for which an ARQ acknowledgement has not yet been received, and comprising exchanging ARQ status messages, successfully received over the air interface, between BSs of the SHO link set.

9. A method according to claim 8, wherein only one of the BSs of the SHO link set is transmitting to the UE.

10. A method according to claim 8, wherein in the downlink direction only one of the BSs of the SHO link set is transmitting to the UE but all other BSs seek to synchronise their buffers with the transmission buffer of the transmitting BS.

11. A mobile telecommunications system comprising a Universal Mobile Telephone System UMTS Terrestrial Radio Access Network (UTRAN) and, located in the UTRAN:

a Gateway (GW) arranged to segment Radio Link Control (RLC) Service Data Units (SDUs) into RLC Protocol Data Units (PDUs) for transmission to at least one or more Base Station (BS) of a set of BSs belonging to a handover link set, and to combine RLC PDUs received from at least one of the BSs into RLC SDUs for transmission to a core network of the system; and a plurality of Base Stations (BSs) arranged to form a soft handover link set for a given User Equipment (UE), each said BS being arranged to buffer RLC PDUs received from at least one of the GW and the UE and to implement an Automatic Repetition Request (ARQ) mechanism at each of the at least one BS to facilitate reliable transmission of RLC PDUs between the UE and the GW, the ARQ mechanism utilizing ARQ status messages sent over the air interface, between the UE and the BS(s), in order to acknowledge successfully transmitted data packets and request retransmission of unsuccessfully transmitted data packets.

12. A Gateway for use in a Universal Mobile Telephone System (UMTS) Terrestrial Radio Access Network (UTRAN) in a mobile telecommunications system, comprising:

means for segmenting Radio Link Control (RLC) Service Data Units (SDUs) into RLC Protocol Data Units (PDUs) for transmission to at least one Base Station (BS) of a set of BSs belonging to a handover link set, and means for combining RLC PDUs received from at least one of the BSs into RLC SDUs for transmission to a core network of the system.

* * * * *